No. 749,980. Patented January 19, 1904.

UNITED STATES PATENT OFFICE.

BAPTISTE BALTHAZARD, OF ST. FONS, FRANCE, ASSIGNOR TO SOCIÉTÉ CHIMIQUE DES USINES DU RHÔNE, ANCIENNEMENT GILLIARD, P. MONNET ET CARTIER, OF ST. FONS, NEAR LYONS, FRANCE, A CORPORATION OF FRANCE.

PROCESS OF MAKING ACETYL-SALICYLIC ACID AND ESTERS THEREOF.

SPECIFICATION forming part of Letters Patent No. 749,980, dated January 19, 1904.

Application filed January 27, 1903. Serial No. 140,784. (No specimens.)

*To all whom it may concern:*

Be it known that I, BAPTISTE BALTHAZARD, chemist at the works of Société Chimique des Usines du Rhône, Anciennement Gilliard, P. Monnet et Cartier, of St. Fons, near Lyons, France, have invented certain new and useful Improvements in the Manufacture of Acetyl-Salicylic Acid and Esters Thereof, of which the following is a specification.

This invention relates to the manufacture of acetyl-salicylic compounds, including the acid and the esterified acids—such as its methyl, ethyl, propyl, amyl, glyceryl, phenyl, benzyl, and other esters, some of which are new compounds and useful for therapeutical purposes.

I have discovered that if a mixture of acetate of sodium and of salicylic acid or of an esterified salicylic acid or the sodium salt of salicylic acid or of an esterified salicylic acid be heated together with paratoluene sulfochlorid or a similar organic chlorid the corresponding acetylated compound—namely, acetyl-salicylic acid or an esterified acetyl-salicylic acid—is obtained and may be purified by recrystallization from alcohol or chloroform, as a general rule preferably from chloroform. Instead of the sodium salts the corresponding potassium salts may be employed.

For the purposes of this invention the salicylic-acid ester and the salicylic acid are substantial equivalents, as are also the acetyl-salicylic acid and its ester.

*Example of manufacture of acetyl-salicylic acid.*—Four hundred and fourteen grams salicylic acid (or four hundred and eighty grams sodium salicylate) are mixed with five hundred and seventy grams toluene sulfochlorid and two hundred and forty-six grams sodium acetate and slowly heated to 100° centigrade. Reaction commences about this temperature, and the mass then heats itself further to about 150° centigrade. After it has cooled again to about 100° centigrade the mass is dissolved in water and neutralized in the cold with solvay soda. Unaltered sodium salicylate and toluene sulfonate of sodium go thereby into solution and the acetyl-salicylic acid is filtered off. With the above quantities the operation of heating and cooling occupies about two hours. Acetyl-salicylic-acid esters—for example, methyl esters—are obtained by using salicylic-acid esters—for example, methyl salicylate or its sodium salt—in place of salicylic acid.

The esters of acetyl-salicylic acid may also be obtained, according to the present invention, by the acetylation of salicylic esters by the ordinary methods of acetylation, and especially with acetic anhydrid. For example:

*Preparation of acetyl-salicylate of methyl.*— One part, by weight, of methyl salicylate, two parts, by weight, of acetic anhydrid, are heated for two hours at 150° centigrade, and the excess of acetic anhydrid and unaltered methyl salicylate then distilled off. The residual ester is recrystallized from alcohol or chloroform and consists of acetyl-salicylate of methyl. When pure, it recrystallizes in colorless needles without odor, melting about 49° centigrade, very soluble in alcohol and chloroform, insoluble in water. This ester of acetyl-salicylic acid may also, according to the present invention, be prepared by the treatment of acetyl-salicylic acid with sodium methyl sulfate or with methyl-alcohol and a mineral acid, and corresponding esters may be produced by the substitution of other alcohols for methyl-alcohol in the method last mentioned.

*Further example of manufacture of acetyl-salicylic-acid esters.*—Three hundred parts acetyl-salicylic acid are mixed with forty parts sulfuric acid 66° Baumé and ninety parts methyl-alcohol and heated on the water-bath with a return condenser for twelve hours. The product is then diluted with water and neutralized with solvay soda and the acetyl-salicylic acid methyl ester filtered off and purified by recrystallization.

If sodium methyl sulfate be used, one hundred and sixty grams of this salt are heated with three hundred and sixty grams acetyl-salicylic acid and two hundred grams methyl-alcohol for ten hours at about 100° centigrade, the excess of methyl-alcohol then distilled off, and the product treated as above.

What I claim, and desire to secure by Letters Patent, is—

1. In the manufacture of acetyl-salicylic compounds, the process which consists in heating acetate of sodium and a salicylic compound with an aromatic sulfochlorid.

2. In the manufacture of acetyl-salicylic compounds, the process which consists in heating acetate of sodium and a salicylic compound with paratoluene sulfochlorid.

3. In the manufacture of an esterified acetyl-salicylic acid, the process which consists in heating acetate of sodium and an esterified salicylic acid with an aromatic sulfochlorid.

4. In the manufacture of an esterified acetyl-salicylic acid, the process which consists in heating acetate of sodium and an esterified salicylic acid with paratoluene sulfochlorid.

In witness whereof I have hereunto signed my name in the presence of two subscribing witnesses.

BAPTISTE BALTHAZARD.

Witnesses:
 THOS. N. BROWNE,
 MARIUS VACHON.